United States Patent
Littlejohn

(10) Patent No.: US 9,390,756 B2
(45) Date of Patent: Jul. 12, 2016

(54) DYNAMIC AUDIO FILE GENERATION SYSTEM AND ASSOCIATED METHODS

(76) Inventor: William Littlejohn, Burlingame, CA (US)

( * ) Notice: Subject to any disclaimer, the term of this patent is extended or adjusted under 35 U.S.C. 154(b) by 893 days.

(21) Appl. No.: 13/548,582

(22) Filed: Jul. 13, 2012

(65) Prior Publication Data

US 2013/0018496 A1    Jan. 17, 2013

Related U.S. Application Data

(60) Provisional application No. 61/507,282, filed on Jul. 13, 2011.

(51) Int. Cl.
*G10H 1/36* (2006.01)
*G11B 27/034* (2006.01)
*H04H 60/04* (2008.01)

(52) U.S. Cl.
CPC .............. *G11B 27/034* (2013.01); *H04H 60/04* (2013.01)

(58) Field of Classification Search
CPC ............................... G11B 27/034; H04H 60/04
USPC .......................................................... 84/634
See application file for complete search history.

(56) References Cited

U.S. PATENT DOCUMENTS

| | | | |
|---|---|---|---|
| 7,734,364 B2 | 6/2010 | Wesemann et al. | |
| 7,735,011 B2* | 6/2010 | Najdenovski | G10H 1/0016 715/716 |
| 7,869,892 B2 | 1/2011 | Foust et al. | |
| 8,229,582 B1* | 7/2012 | Ireland | A63H 19/00 246/217 |
| 2010/0050854 A1* | 3/2010 | Huet | G10H 1/0025 84/611 |
| 2010/0145794 A1 | 6/2010 | Barger et al. | |
| 2010/0211199 A1 | 8/2010 | Naik et al. | |
| 2010/0257994 A1* | 10/2010 | Hufford | G10H 1/0025 84/609 |

* cited by examiner

*Primary Examiner* — Jianchun Qin
(74) *Attorney, Agent, or Firm* — Mark Malek; Daniel Pierron; Widerman Malek, PL

(57) ABSTRACT

A dynamic sound file generation system and method for using same is provided. The system is comprised of a controller, a plurality of databases, a rules engine, a control DSP module, and a combiner to alter and combine audio tracks into an output file. The sound file generation system may apply rules to dynamically generate audio files. The audio file generation system may advantageously and automatically create original, on-demand custom media file content by mixing and layering multiple media file sources from a source library to create a single composite file for delivery to a client device.

18 Claims, 9 Drawing Sheets

DYNAMIC AUDIO FILE GENERATION SYSTEM AND ASSOCIATED METHODS

RELATED APPLICATIONS

This application is related to and claims the benefit of U.S. Provisional Patent Application Ser. No. 61/507,282 entitled Dynamic Audio File Generation System and Associated Methods filed Jul. 13, 2011, the entire contents of which are incorporated herein by reference.

FIELD OF THE INVENTION

The present invention relates generally to sound file generation systems and, in particular, to a sound file generation system and method for applying rules to one or more audio tracks to dynamically generate a sound file with desired attributes.

BACKGROUND OF THE INVENTION

Audio files are a common product in today's market. Since the advent of methods to capture audio media, users have become enthralled with the idea of changing those files to make them sound better, louder, more realistic, or even distorted. This interest has resulted in the creation of systems for audio file mixing and layering.

Audio file mixing and layering devices are frequently used in the music media industry for purposes of creating a finished audio file product. Furthermore, audio files generated from the aforementioned mixing and layering devices may be incorporated or integrated into various additional audio-visual applications, such as film, television, video games, advertising, and additional works that may use audio mixing and layering devices. The automation of this process has become popular and useful for enhancing sound file generation efficiency. A consumer need for more original, customized content has continued to drive the development of additional devices that accomplish the task of audio file generation.

U.S. Published Patent Application No. 2010/0145794 to Barger et al. discloses an on-demand media processing engine for delivering files to a user terminal. It allows a user to select media content to be downloaded to a user terminal. The engine then selects a piece of advertisement media for the user to consume as ell. The Barger '794 device then delivers the file to the end user.

While the Barger et al. '794 application delivers composite media, there is no mixing or layering. The invention of the Barger et al. '794 application simply splices requested pre-existing media to a piece of advertisement media for end user consumption. The Barger et al. '794 application provides no customized composite content.

U.S. Pat. No. 7,734,364 to Wesemann et al. discloses creation of a single composite media file from multiple preexisting files for use as an exercise routine. The invention of the '364 Wesemann et al. patent allows a trainer or expert to select files that would create an ideal workout routine and mix them together in order to create a product for an end user.

According to the Wesemann et al. '364 patent, the composite file is customized. Criteria for customization, however, is neither chosen by the end user nor customizable on-demand. The Wesemann et al. '364 patent still leaves a need for content that can be customized on-demand by and for an end user.

U.S. Pat. No. 7,869,892 to Foust et al. discloses a system that allows editing of media files into a single layered file. A user may call up any number files to be layered together, which are then still moveable and editable until rendering. On rendering, the multiple files become a single layered file, and individual layer editing is locked.

While the Foust et al. '892 patent does allow editing, it does not allow for true automation of the editing. The invention of the Foust et al. '892 patent merely describes an editing platform, rather than an automated editor. Content may be customized, but with a considerable amount of work on the part of the user. Further, the Foust et al. '892 patent does not allow for automatic drawing of source files from a preexisting set.

U.S. Published Patent Application No. 2010/0211199 to Naik et al. discloses playing back primary and secondary media files. Essentially, a user may call two files, which may be played back simultaneously. The invention of the '199 Naik et al. application can then fade, cross fade, or duck either of the two files as the user wishes.

While the '199 Naik et al. application, discusses fading, cross fading, and ducking of the two files, it does not provide for complex mixing and editing. Further, the two files may not be merged into a single media output file. Generally speaking, the Naik et al. '199 application simply provide playback of multiple media sources without the ability to dynamically create custom, on-demand content.

There exists a need for a product that provides the ability to automatically create original, on-demand custom media file content by mixing and layering multiple media file sources from a source library to create a single composite file for delivery to a user terminal.

SUMMARY OF THE INVENTION

In view of the foregoing, it is therefore an object of the present invention to provide a sound file generation system for applying rules to dynamically generating audio files that does not suffer from the drawbacks of known solutions. The system of the present invention advantageously automatically creates original, on-demand custom media file content by mixing and layering multiple media file sources from a source library to create a single composite file for delivery to a client device.

The audio file generation system of the present invention may include a controller that may communicate with a database server. The database server may include one or more local databases to be accessed and analyzed by the controller. The database server may additionally access a remote database. The databases may include a tracks database, parameters database, rules database, digital signal processing (DSP) effects database, output files database, user database, and additional databases.

A rules engine may apply rules to parameters that define the tracks, resulting in the application of one or more control DSP modules to manipulate the tracks. The tracks may then be combined by a combiner into an output audio file. The output file may be transmitted to a user, stored in an output file database, or hosted by a web server.

DETAILED DESCRIPTION OF THE INVENTION

Figure 1:
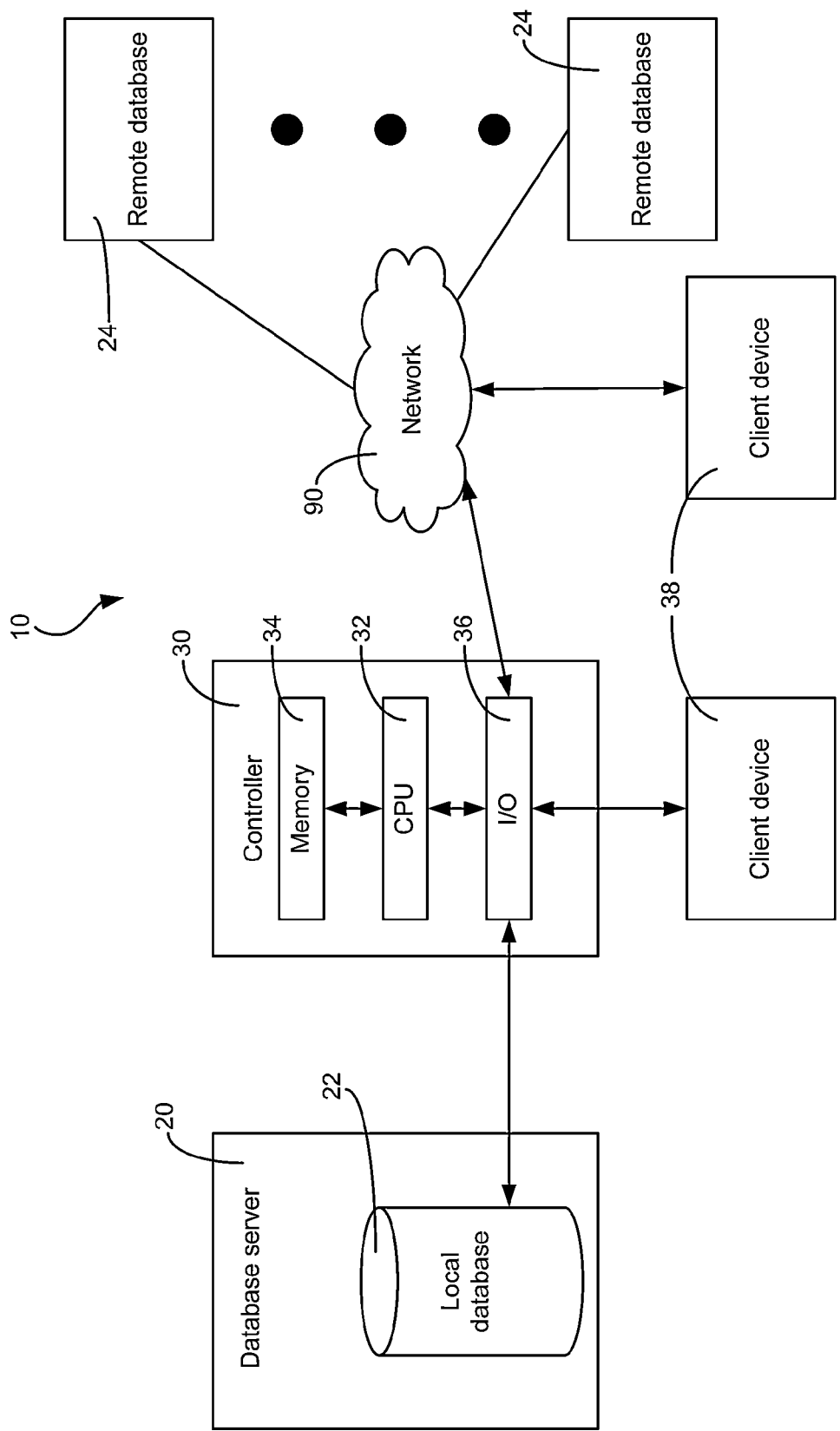
FIG. 1 is a block diagram of the audio file generation system of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Referring now to FIGS. 1-9, a dynamic audio file generation system 10 according to the present invention is now described in greater detail. Throughout this disclosure, the dynamic audio file generation system 10 may also be referred to as an audio file generation system 10, a system, or the invention. Alternate references of the audio file generation system 10 in this disclosure are not meant to be limiting in any way.

In the following disclosure, various elements may be described to manipulate and analyze data stored within one or more databases. As would be appreciated by a person of skill in the art, these elements may be operated on a computerized system. Additionally, the various illustrative program modules and steps disclosed herein may be implemented via electronic hardware, computer software, or combinations of both. The various illustrative program modules and steps have been described generally in terms of their functionality. Whether the functionality is implemented as hardware or software depends in part upon the hardware constraints imposed on the system. Hardware and software may be interchangeable depending on such constraints.

Provided as a non-limiting example, the various illustrative program modules and steps, described in connection with the embodiments disclosed herein, may be implemented or performed via a computerized device. Such computerized devices may include, but should not be limited to, an application specific integrated circuit (ASIC), a field programmable gate array (FPGA), other programmable logic device, discrete gate logic, transistor gate logic, discrete hardware components, conventional programmable software module and a processor, or any combination thereof that may be designed to perform the functions described herein.

The computing device may include a processor. The processor may be a microprocessor, CPU 32, controller 30, microcontroller 30, programmable logic device, array of logic elements, or state machine. The software module may reside in random access memory 34 (RAM), flash memory 34, read only memory 34 (ROM), erasable program able read only memory 34 (EPROM), electrical erasable programmable read only memory 34 (EEPROM), hard disk, removable disk, CD, DVD or any other form of storage medium known in the art. As will be appreciated by skilled artisans, a processor may be operatively connected to a storage medium to read and write information to and from the storage medium, respectively. Alternately, the storage medium may be integrated into the processor.

Those skilled in the art will appreciate that the foregoing methods may be implemented by executing a program located within a computer readable medium. The medium may include, for example, RAM accessible by or residing within the device. The program modules may additionally be stored on a variety of machine readable data storage media. Such media may include a hard drive, magnetic tape, electronic read-only memory 34 (ROM or EEPROM), flash memory 34, an optical storage device (CD, DVD, digital optical tape), or other suitable data storage media.

Referring now to FIG. 1, the audio file generation system 10 of the present invention will now be discussed. The audio file generation system 10 of the present invention may include a controller 30 that may communicate with a database server 20. The database server 20 may include one or more local databases 22 to be accessed and analyzed by the controller 30. The database server 20 and/or the controller 30 may additionally access remote databases 24. The databases 22, 24 may include a tracks database 21, parameters database 23, rules database 25, digital signal processing (DSP) effects database 26, output files database 28, user database 29, and additional databases, as further illustrated in FIG. 3.

Figure 2:
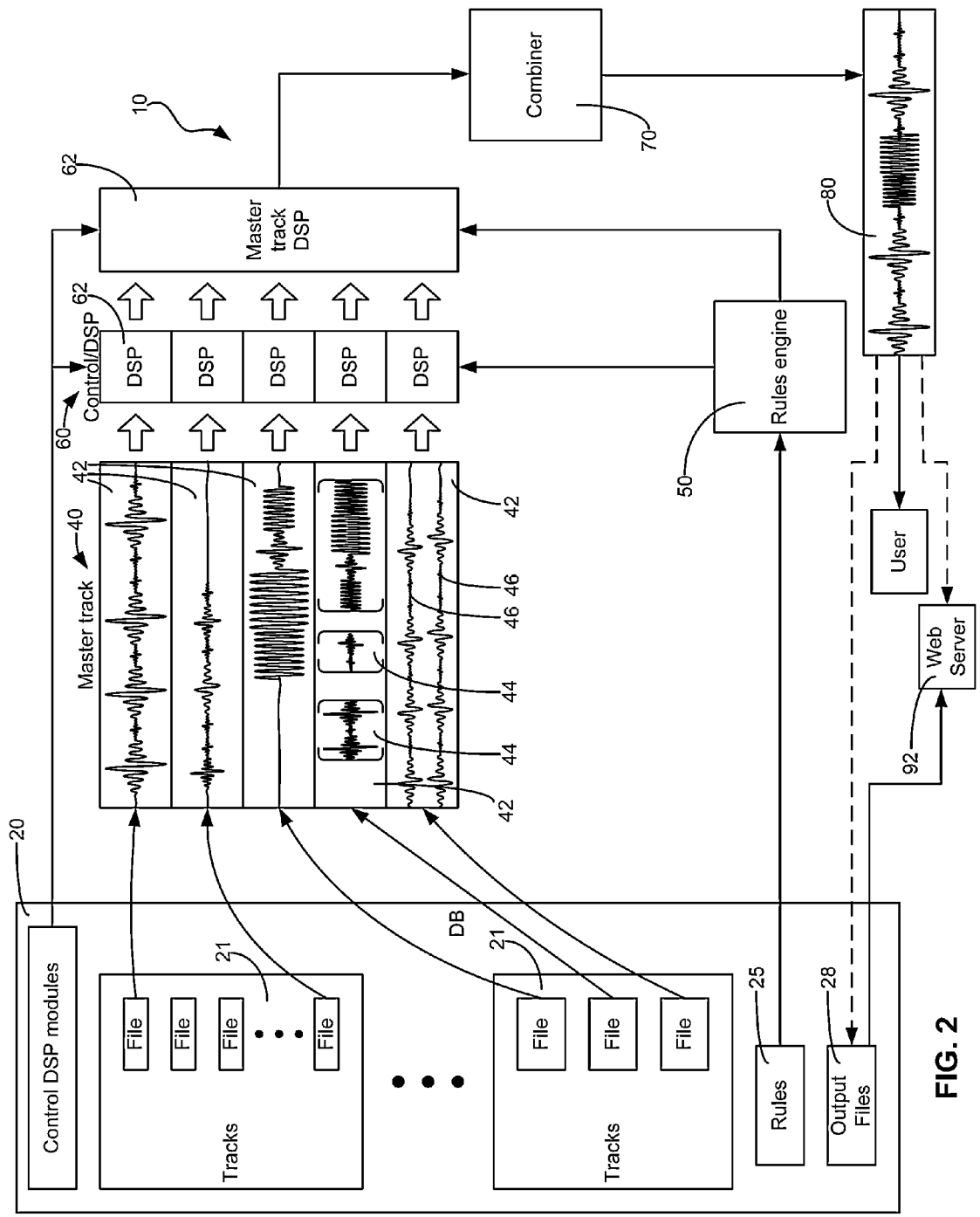
FIG. 2 is an additional block diagram of the audio file generation system of FIG. 1.

Referring additionally to FIG. 2, a rules engine 50 may apply rules to parameters that define the tracks 42, resulting in the application of one or more control DSP module 60 to manipulate the tracks 42. The tracks 42 may then be combined by a combiner into an output audio file.

Referring back to FIG. 1, the controller 30 used to access and analyze data, in accordance to an embodiment of the present invention, will now be discussed in greater detail. A controller 30 may be included as a local component of the audio file generation system 10. The controller 30 may include a central processing unit (CPU) 32, memory 34, and an input/output (I/O) interface 36. The CPU 32 may be configured to receive a data signal from additional components of the audio file generation system 10, such as the database server 20 and/or the network 90 interface.

The CPU 32 may compute and perform calculations to the data received by the additional components. As a non-limiting example, the CPU 32 may receive data relating to parameters for a track 42 or rules from the database server 20. A rules engine 50 may then be operated on a CPU 32 to analyze the data and determine whether the parameters are in compliance with the rules. After the CPU 32 determines the state of compliance of the parameters with the rules, the CPU 32 may call one or more control DSP module 60 to apply a DSP effect 62 to the track 42.

The controller 30 may also include memory 34. The memory 34 may include volatile and non-volatile memory 34 modules. Volatile memory 34 modules may include random access memory 34, which may temporarily store data and code being accessed by the CPU 32. The non-volatile memory 34 may include flash based memory 34, which may store the computerized program that may be operated on the CPU 32 and audio data that may be included within the tracks 42 stored within the database server 20 and/or accessible via the network 90 interface.

Additionally, the memory 34 may include the computerized code used by the CPU 32 to control the operation of the audio file generation system 10. The memory 34 may also store feedback information related to the operation of additional components included in the audio file generation system 10. In an embodiment of the present invention, the memory 34 may include an operating system, which may additionally include applications that may be run from within the operating system, which will be appreciated by a person of skill in the art.

The controller 30 may also include an I/O interface 36. The I/O interface 36 may control the receipt and transmission of data between the controller 30 and additional components. Provided as a non-limiting example, the I/O interface 36 may receive a data communication signal from a user, which may further include instructions on how apply the rules with respect to the parameters of the tracks 42. After the CPU 32 has analyzed the parameters of the tracks 42, the I/O interface 36 may transmit a signal to control DSP module 60 to apply the desired DSP effect 62 defined therein.

Figure 3:
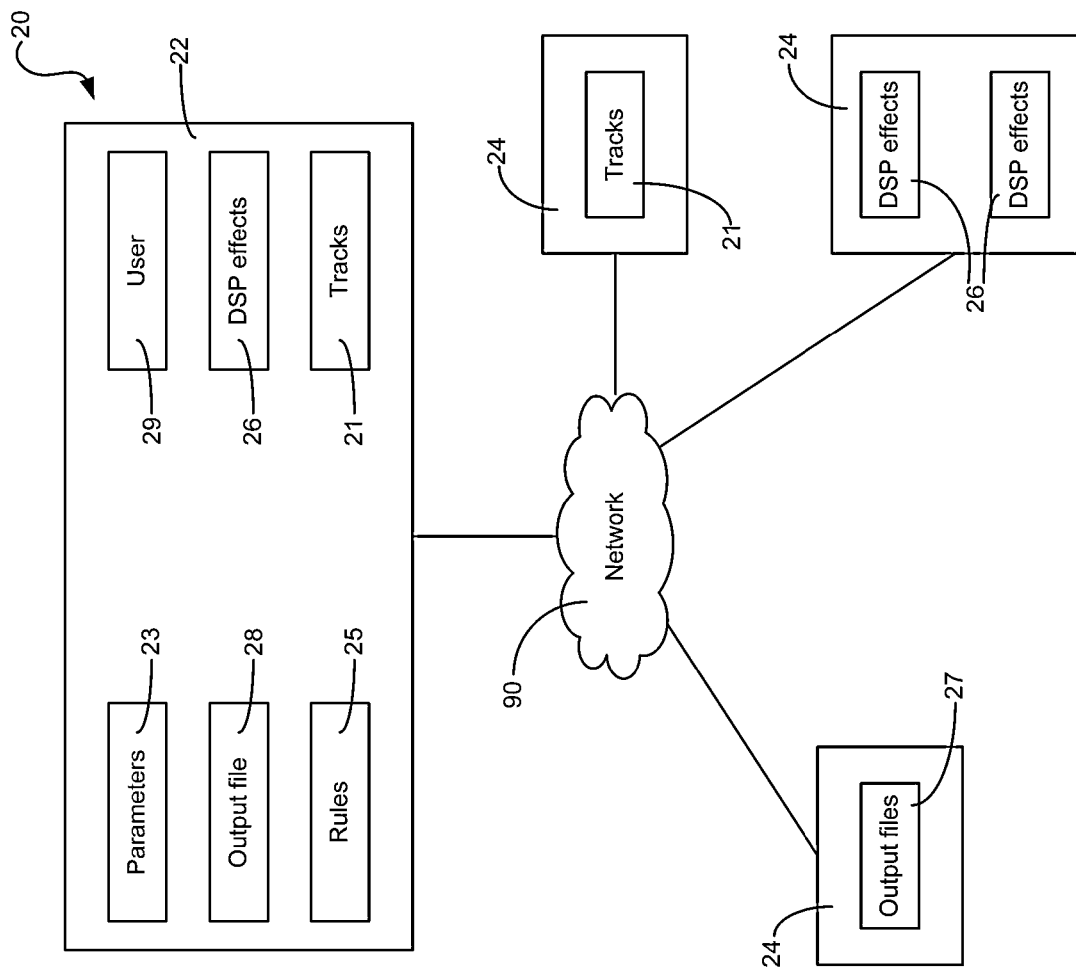
FIG. 3 is a block diagram illustrating the databases included in the audio file generation system according to an embodiment of the present invention.

Referring now additionally to FIGS. 2 and 3, the database server 20 included in audio file generation system 10 of the present invention will now be discussed in greater detail. The database server 20 may manage and analyze the data included within the databases. A person of skill in the art will appreciate that the term "databases," as used herein, is intended to include local databases 22, remote databases 24, and any other databases that may be used with the audio file generation system 10 of the present invention. Therefore, skilled artisans should not read any limitation into the general use of the term, "databases," within the present disclosure.

The databases may include data used by the audio file generation system 10 of the present invention to analyze parameters included in the tracks 42 for compliance with the rules included in a rules engine 50 and apply the DSP effect 62 included within a corresponding control DSP module 60. The data included in the databases may be stored in databases such as, for example and without limitation, tracks 42, sound files, rules, control DSP modules 60, parameters, and users. A person of skill in the art will appreciate the inclusion of additional data in the databases which may be used to analyze, manage, and store information related to operation of the audio file generation system 10 of the present invention.

The data included in a track 42 will be understood by a person of skill in the art to include one or more electronic representations of an audio signal. The tracks 42 may include one or more channels 46 of audio data, such as, for example, monaural, stereo, or multichannel 46 audio data. The tracks 42 may further include parameters to define the contents of the audio data included therein. The parameters may be stored within the tracks 42 as, for example, metadata. Alternately, the parameters may be stored in a separate file or dataset, which may be associated with one or more tracks 42. In an embodiment wherein the parameters are stored separately from the audio data of a track 42, the files or datasets including the parameters may be located in a parameters database 23. A person of skill in the art will appreciate the location and storage of parameters in a plethora of additional database types included within the scope and spirit of the present invention.

The database server 20 may additionally include a rules database 25. The rules database 25 may include a set of conditions or logic operations that may be applied to the tracks 42 and/or parameters. More specifically, the parameters may be analyzed according to one or more rules for compliance. Upon a determination of compliance with the rules, a rules engine 50 may determine one or more control DSP modules 60 that may apply one or more DSP effect 62 to modify the audio data included within a track 42. The control DSP modules 60 will be discussed in greater detail below.

The database server 20 may additionally include a DSP effects database 26. The DSP effects database 26 may include control DSP modules 60, which may include DSP effects that may be applied to tracks 42 to modify the included audio data. DSP effects 62 that may be called by a control DSP module 60 to modify a track may include, but should not be limited to, delaying commencement of playback of a track 42, applying echo effects applied to a track 42, time specific activation or deactivation of a track 42, inclusion of a specific track 42 based on a set of desired parameters, and an abundance of additional effects that would be appreciated by a skilled artisan.

Additionally, the rules included in a rules database 25 may be applied to additional data included in other databases. For example, the audio file generation system 10 of the present invention may offer its audio file generation services to clients as a tiered subscription service, with each tier offering a different level of access to the control DSP modules 60 included in the respective databases. The audio file generation system 10 may apply a rule to a user profile, stored within a user database 29, to determine which control DSP modules 60 a user may access according to her subscription tier. The rules engine 50 may then determine to limit or provide access to the corresponding control DSP module 60. The user database 29 will be discussed in more detail below.

As previously mentioned, the database server 20 may additionally include a user database 29, which may additionally include user data related to a user. User data may be any data that could be used to define a user or the privileges of a user. Examples of user data may include name, address, finance information, usage permissions, pointers or links to personal tracks 42, history data, or subscription tier. A person of skill in the art will appreciate the inclusion of additional user data, which may define virtually any other informational data that may be associated with a user, to be included within the scope and spirit of the present invention.

The database server 20 or remote databases 24 may additionally include a geo-location database, which may store location data associated with a user. The location data may be gathered, for example, by a GPS locator, user entered information, the IP address of the user's computer or client device 38, or other location sensing operations that would be appreciated by a skilled artisan. The location data associated with a user may be used to customize an interface for the user. For example, the audio file generation system 10 may determine that the user is located within the United States and set the default language to English. Additionally, the audio file generation system 10 may determine that the user is located in California, correspondingly setting all time calculations to occur relative to the Pacific time zone. A person of skill in the art will appreciate additional customizations that may be included in the present invention based on location data included in a geo-location database.

The database server 20 may additionally include an output file database 28 to store and distribute output files 80 generated during operation of the audio file generation system 10 of the present invention. For example, after the audio file generation system 10 generates an output file 80, it may include the output files 80 in the output file database 28. The included output file 80 may then be downloaded, streamed, or otherwise accessed by a user.

Additionally, a plurality of output files 80 may be included in the output file database 28. One or more output files 80 may be associated to a user as a library, such that the user may access his or her library upon demand. A person of skill in the art will appreciate embodiment wherein an output file 80 may be associated to one or more users. Additionally, a skilled artisan will appreciate that user access to one or more output files 80 included within an output file database 28 may be controlled and managed dependent of compliance with rules.

The audio file generation system 10 may include a client device 38, through which a user may access and control the audio file generation system 10 of the present invention. Such access may be performed via a user interface, which will be described in more detail below. Alternately, the controller 30 and/or database server 20 of the audio file generation system 10 may be communicatively connected to one or more client devices 38 by way of a network 90, such as the Internet, such that the client device is positioned in communication with the controller. For clarity in the following disclosure, references to client devices 38 will be made with respect to a single client device 38. A person of skill in the art will appreciate, however, that a plurality of client devices 38 may be connected to an audio file generation system 10 within the scope of the present invention. Therefore, skilled artisans should not view the following disclosure as limiting the audio file generation system 10 of the present invention to include only one client device 38.

The audio file generation system 10 of the present invention may be accessed by a user via a user interface, which will now be discussed in greater detail. The user interface may be accessed and interacted by a user. Through the interface, a user ray manipulate and generate audio output files 80 via the audio file generation system 10 of the present invention. More specifically, the user interface may allow a user to access and interact with tracks 42 and other data included in the databases of the database server 20. Skilled artisans will appreciate that the user interface may include a web interface, which may be accessed via a network 90.

The user interface may additionally include, for example and without limitation, menus, fields, and additional user controls. Additionally, the user interface may be comprised of components generated from web form code and user control code. A person of skill in the art will appreciate that the user interface may be comprised of number of interactive and static elements, through which a user may access and/or manipulate data to use the audio file generation system 10 of the present invention.

Provided for illustrative purposes in the interest of clarity, and without limitation, the menus will now be discussed. Menus may allow the user to customize the tracks 42 to generate a desired audio file. Menus may also allow a user to select one or more rule that he may desire be applied to the tracks 42, resulting in the customized, dynamic generation of the output audio file. Fields may be defined as location wherein a user may enter data. More specifically, a user may enter data relating to parameters, rules, sound files locations, track 42 locations, a desired storage destination for an output file 80, or any number of additional data that may affect the manipulation and storage of data within the databases. A person of skill in the art will appreciate additional user controls that may be interacted by a user to access, manipulate, and combine audio data included in tracks 42 to be included in the audio file generation system 10 of the present invention.

The tracks 42, which may be included within a tracks database 21 of the audio file generation system 10 of the present invention, will now be described in greater detail. As previously mentioned, the tracks 42 may include audio data to define a sound wave. The audio data included within the tracks 42 may be stored digitally in a database, such as, for example, the tracks 42 database 21 included in the database server 20.

Each track 42 may be stored separately in the database server 20, for example, wherein each track 42 is stored as a separate file. Alternately, one or more tracks 42 may be included in a single file and stored within a database. The beginning and ending of each track 42 may be defined by place markers, bookmarks, or other identifying data which may be included within parameters. A skilled artisan will appreciate that data defining the beginning and ending of each track 42 may be included in locations and datasets other than the parameters, and are intended to be included within the scope and spirit of the present invention. Furthermore, a person of skill in the art will appreciate that, as one or more tracks 42 may be included in a single audio file, a single track 42 may be included within or span across one or more audio files.

Tracks 42 may include one or more channel 46, which may be defined as a stream of audio information. Optimally, each audio channel 46 may be designated to play through a speaker. However, a person of skill in the art will appreciate that any number of channels 46 may be played on any number of speakers. For example, a monaural track 42 may include only one audio channel 46 and be designated to play through one speaker. Alternately, the monaural track 42 may be played through a stereo receiver, wherein the audio information included in the monaural tracks 42 is duplicated to be played on each speaker driven by the stereo receiver.

Similarly, the tracks 42 may include one or more segment 44, which may be defined as at least a part of a stream of audio information. A segment 44 may include one or more channels 46. For example, a track 42 may include only one segment 44 that may occupy the entire length of the track 42. In another example, a plurality of segments 44 may be combined and/or concatenated to collectively form a track 42. DSP effects 62 included within a control DSP module 60 may be applied to individual segments 44 of a track 42, such as, for example, time shifting.

Each audio channel 46 of a track 42 may be manipulated and controlled independent of or in conjunction with the other channels 46 of a track 42. Similarly, each track 42 may be manipulated and controlled independent of, or in conjunction with, the other tracks 42 that may form the output audio file. A master track 40 may be defined as a logical element in which all tracks 42 may be included. All tracks 42 intended to be included in the output file 80 may be manipulated and controlled together by manipulating and controlling the master track 40. However, although all included tracks 42 may be manipulated through the master track 40 as one logical track 42, each track 42 may also continue to be manipulated individually. It is not until after the tracks 42 have been merged by the combiner 70 that the tracks 42 may become one track 42 included in an audio output file 80.

The audio file generation system 10 of the present invention may additionally include one or more control DSP module 60, which will now be discussed in greater detail. The control DSP module 60 may perform DSP effects 62 to a digital audio signal. Through DSP effects 62, the control DSP module 60 may alter or manipulate a digital audio signal, creating and outputting a modified iteration of the received digital audio signal. As will be discussed below, a digital audio signal may be generated from an analog signal.

As will be understood by a person of skill in the art, sound is generally emitted from a source and received by an auditory receiver, such as an ear, as an analog signal. The following non-limiting example is present to illustrate a conversion between analog and digital signals. Through signal conversion, the process of which will be understood by a skilled artisan, the analog signal may be converted to a digital signal. A digital signal may then be analyzed, processed, and manipulated with greater ease than the corresponding analog signal. The potentially modified digital signal may then be converted back into an analog signal, which may then be received by the auditory receiver.

The control DSP module 60 may include a DSP effect 62, or a sound alteration operation, which may modify or manipulate an audio signal included within the track 42 prior to being outputted by the audio file generation system 10 of the present invention. Some illustrative DSP effects 62, which may be performed by the control DSP module 60 may include time shifting, equalization, filtering, nose cancellation, echo, reverb, removal, addition, modulation, panning, relative volume, absolute volume, beat matching, or any other alteration that may modify the digital audio signal included within a track 42 or audio file.

For illustrative purposes, the time shifting DSP effect 62, which may be performed by a control DSP module 60, will now be described in greater detail. Time shifting may occur when at least a portion of an audio signal is replayed at a time other than a time that was originally defined. For example, without limitation, the rules engine 50 may determine that a three second segment 44 is missing from a track 42. The rules engine 50 may then call a time shifting DSP effect 62, which may time shift a subsequent segment 44 of the track 42 to play three seconds prior to its original replay designation. The time shifting DSP effect 62 of a corresponding control DSP module 60 may thus advantageously create smooth and uninterrupted playback despite the absence of one or more segments 44.

Provided as an example of another control DSP module 60, an addition will now be described in greater detail. An addition may occur when a track 42 is additionally included with other tracks 42 to collectively form the output audio file. For example, without limitation, the rules engine 50 may determine that the date is within the month of December. The rules engine 50 may then call a control DSP module 60 to add a track 42 that includes sleigh bells. The audio signal with sleigh bells included in the track 42 may then be included in the output file 80, which may be generated by a merging operation performed by the combiner 70. In this example, a second control DSP module 60 may include a DSP effect 62 to perform a beat matching operation on the sleigh bells track 42. The beat matching DSP effect 62 may align the rhythm of the sleigh bells with the rhythm of the preexisting tracks 42. The performance of a beat matching DSP 62 may advantageously create an acoustically appealing output sound file 80.

The control DSP module 60 may process digital audio data as it may be included in a logical master track 42, a track 42, one or more segments 44, or one or more channels 46 included within a track 42. It will be understood by a skilled artisan that one or more control DSP modules 60 may be applied to different levels of the audio source data. For example, without limitation, the rules engine 50 may call a first control DSP module 60 to apply an effect to the right channel 46 of an audio track 42, perhaps equalizing the volume of the right channel 46 included within the track 42 to match a left channel 46. A second control DSP module 60 may be applied to time shift a segment 44 of the track 42, wherein all included channels 46 are time shifted approximately equally. A third control DSP module 60 may be called by the rules engine 50 to add a sleigh bells track 42 to be included in the combined output file 80. Finally, a fourth control DSP module 60 may be applied to the master track 40, and therefore applied to all tracks 42 included therein, to add an echo effect.

The audio file generation system 10 of the present invention may include a combiner 70, which may merge the tracks 42 to be included in the audio file into an output file 80, will now be discussed in greater detail. The combiner 70 may merge the tracks 42 included in the audio file into a single track 42. The single merged track 42 may include one or more channels 46, providing a monaural, stereo, or multichannel 46 output file 80. Optionally, the combiner 70 may additionally include one or more additional file types. The data from the additional file types may also be included in the output file 80. Examples of additional file types, provided without the intent to be limiting, may include video data, text or caption data, and bookmark data.

An example of a merging operation, which may be performed by the combiner 70 of the audio file generator, will now be presented without any intended limitation. The combiner 70 may overlay the digital audio signals included in each track 42 upon each other. The combiner 70 may then generate a waveform as the tracks 42 are played simultaneously. The generated waveform may be saved or stored electronically, effectively merging the tracks 42 included in audio files into an output file 80. A person of skill in the art will appreciate a number of additional and alternate audio file merging operations, which would be included within the scope and spirit of the present invention.

As will be understood by a person of skill in the art, audio files, much like any other electronic data files, may be created through the use of a variety of codecs and/or file formats. Similarly, an output file 80 may be generated to include or use a variety of codecs and/or file formats. A person of skill in the art will appreciate that the system and method disclosed herein may be operated independent of the codec or format of the input and/or output files 80. If a specific codec may be desired within an embodiment of the present invention, any number of file conversion methods may be used, which would be known to skilled artisans.

As previously mentioned the output file 80 may be stored within a database, such as an output file database 28. The output file database may be included as a local database 22 in the database server 20 or connected as a remote database 24 via a network 90. The output file 80 may alternately be provided to a user for download or storage on a client device 38. Examples of a client device 38 may include, for example, the user's local computing device, such as a personal computer or smart phone. The audio file generation system 10 of the present invention may additionally include a web server 92, which may provide access to the generated audio output file 80 via a remotely located client device 38. The web server 92 may provide access to output files 80 stored on a local database server 20 and/or a network 90 attached device, such as, for example, in an output files database 28. The web server 92 may also receive the output file 80 directly from the combiner 70, Examples of an interface, as it may be provided by a web server 92, may include, but should not be limited to, clickable links, customizable track 42 tables, selectable rules, control DSP effects, and profiles. Optionally, the interface components may be customized by users and administrators of the system. Preferably, the output file 80 is ultimately received by a user.

The audio file generation system 10 may include one or more client device 38. As mentioned above, a client device 38 may include a user interface. Provided as a non-limiting example, the client device 38 may be a computing device that includes a processor and memory 34. Examples of suitable computing devices may include a personal computer, smartphone, mobile phone, or a personal digital assistant. The client device 38 may include a keyboard, mouse, monitor, touch screen or similar device that may be suitable for allowing a user to interact with the connected decision support server.

The audio file generation system 10 may provide a notification to a user upon the occurrence of an event. A notification may include information that is intended to be delivered to a user relating to an event that may have occurred, or as the event may be defined by a rule operated by the rules engine 50. Examples of events may include a successful user login, the completion of the audio file generation operation, or an error. A person of skill in the art will appreciate that the audio file generation system 10 may generate and transmit one or more notices, as may be determined by operation of the rules engine 50 and/or additional components of the audio file generation system 10 of the present invention.

Figure 4:
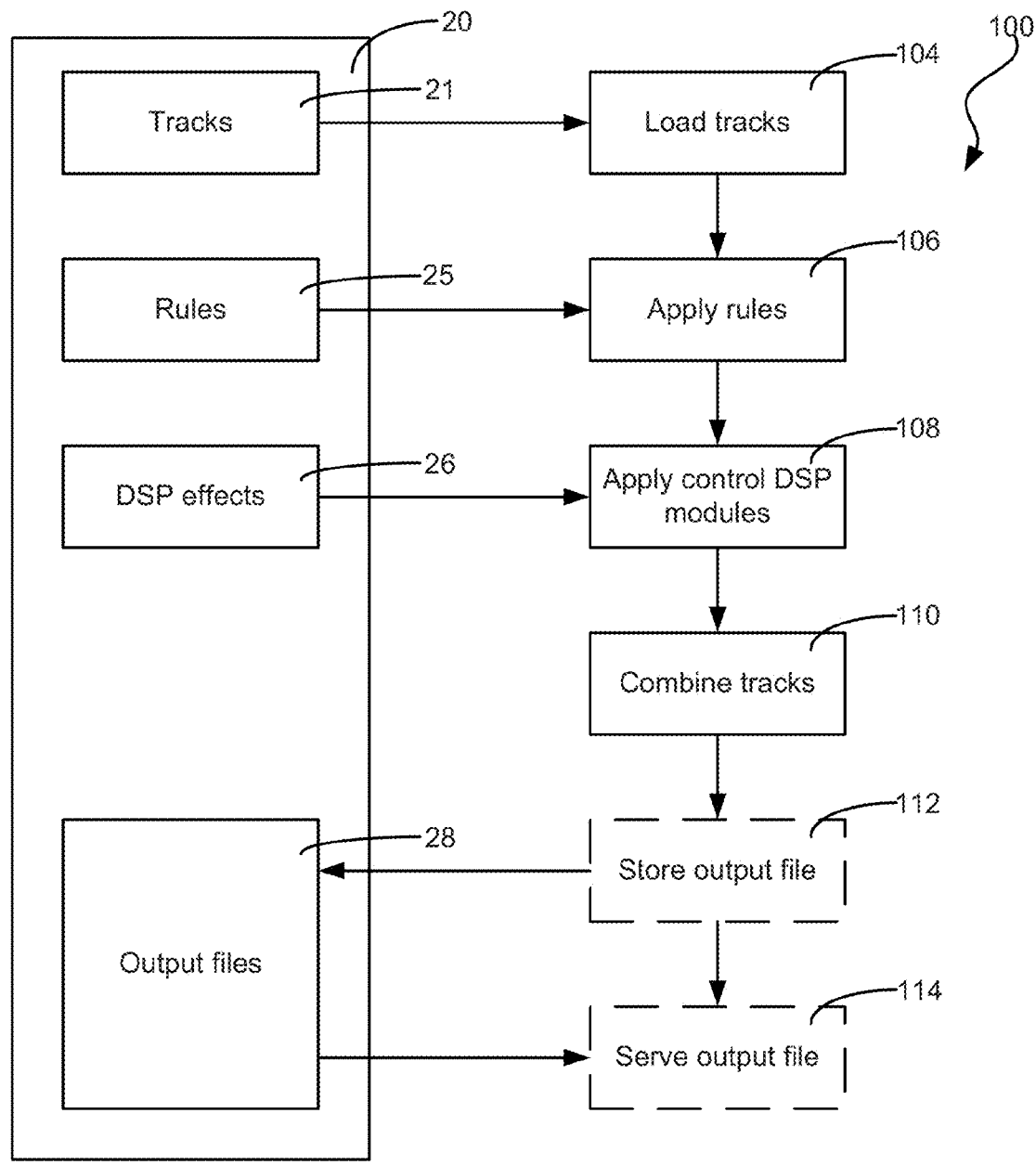
FIG. 4 is a block diagram illustrating the databases included in the audio file generation system as they relate to the operation of the same.

Referring now to the block diagram 100 of FIG. 4, the operation of the audio file generation system 10 of the present invention will now be discussed in greater detail. More specifically, the relationship between the databases and operational steps of the audio file generation system 10 will now be discussed. The following illustrative embodiment is included to provide clarity for one operational method that may be included within the scope of the present invention. A person of skill in the art will appreciate additional databases and operations that may be included within audio file generation system 10 of the present invention, which are intended to be included herein and without limitation.

As previously discussed, the database server 20 may include a plurality of databases. In the present non-limiting example, the database server 20 may include local database 20s such as a tracks 42 database 21, rules database 25, DSP effects database 26, output files database 28. As an initial operation, the audio file generation system 10 may load tracks 42 from the tracks database 21 into a master track 40 to be analyzed and manipulated by the system of the present invention (Block 104). The tracks 42 may be loaded into, for example, the memory 34 included within controller 30 (FIG. 1). The audio file generation system 10 may next apply one or more rule included within the rules database 25. The rules engine 50 of the audio file generation system 10 may analyze the tracks 42, including the parameters associated therewith, and additional parameters, for compliance with the rules (Block 106).

The after applying the rules, the rules engine 50 may determine that one or more control DSP modules 60 should be applied to the tracks 42. The control DSP modules 60 may be loaded from a DSP module database, after which the control DSP module 60 may be applied to the track 42 to manipulate the audio signal included therein (Block 108).

Once all the control DSP modules 60 have been applied to the tracks 42, the combiner 70 may merge the tracks 42 into an output file 80 (Block 110). The output file 80 may then be delivered or transmitted to a user, wherein he or she may store the file at a user defined location. Alternately, the audio file generation system 10 of the present invention may store the output file 80 in an output files database 28 (Block 112). If the audio file generation system 10 includes a web server 92, the output file 80 may be accessed from the output files database 28 to provide access over a network 90 connection, such as the Internet (Block 114).

Figure 5:
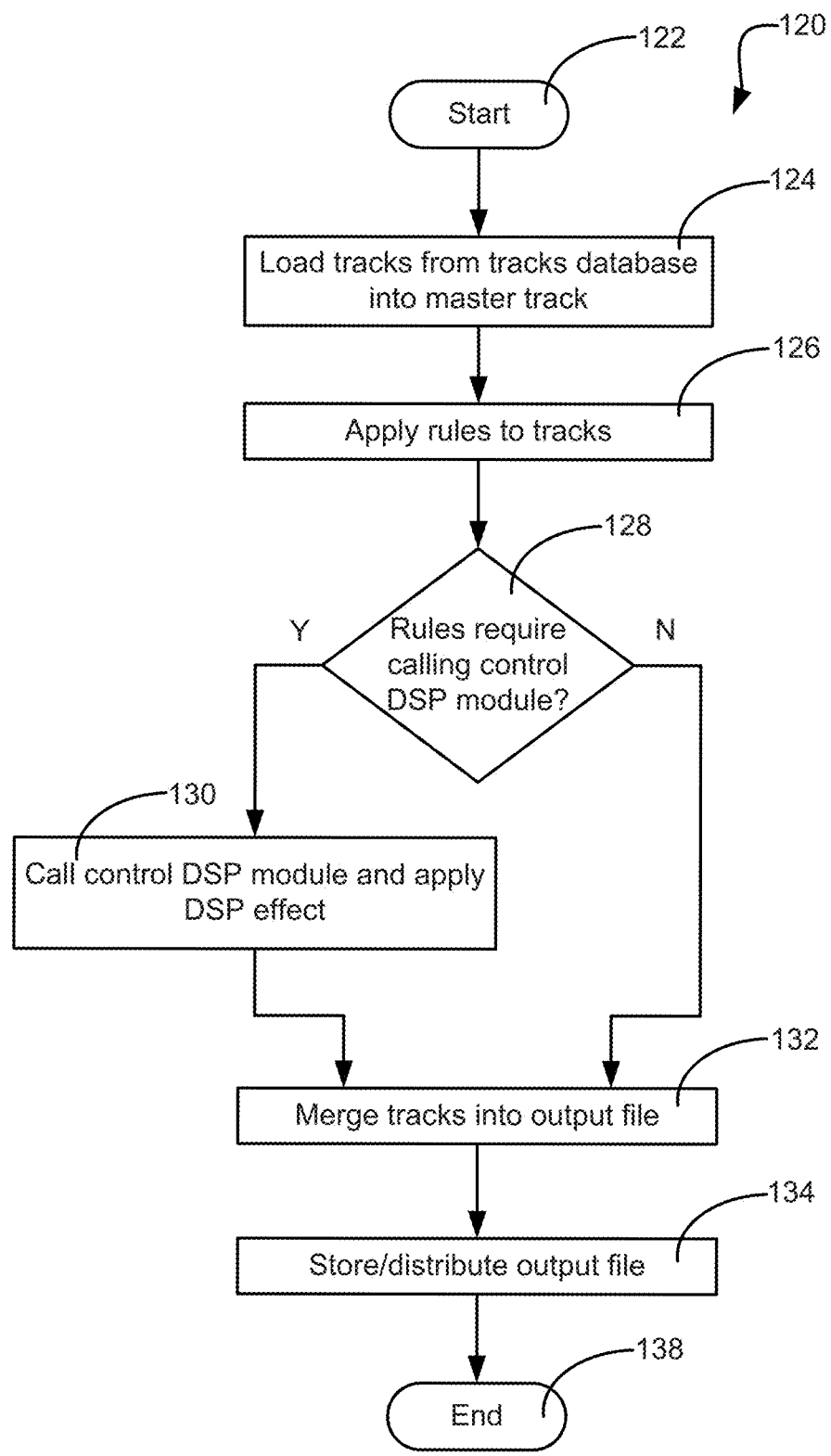
FIG. 5 is a flow chart illustrating the general operation of the audio file generation system according to an embodiment of the present invention.

Referring now to the flowchart 120 of FIG. 5, the general operation of the audio file generation system 10 according to an embodiment of the present invention will now be discussed. The operation may begin at Block 122, wherein the audio file generation system 10 may load tracks 42 from the tracks database 21 into the master track 40 (Block 124). As previously discussed, the tracks database 21 may be located in a local database 20, on a connected database server 20, or on a remote database 24 connected via a network 90. The rules engine 50, a component of the audio file generation system 10, may next apply rules to the tracks 42 (Block 126). By analyzing the rules, the rules engine 50 may determine whether to call a control DSP module 60 to manipulate the audio signal included within one or more track 42 (Block 128). If the rules engine 50 determines that control DSP module 60 should be apply a DSP effect 62 to the track, it may call the corresponding control DSP nodule 60 and apply the DSP effect 62 to the track 42 (Block 130). The control DSP module 60 may be called from the DSP module database.

Once all the DSP effects 62 included in the control DSP modules 60 have been applied to the tracks 42, or if no control DSP module 60 has been called, the combiner 70 may merge the tracks 42 into an output file 80 (Block 132). The output file 80 may then be distributed to a user or stored within an output files database 28 (Block 134). Operation may then terminate at Block 138.

Figure 6:
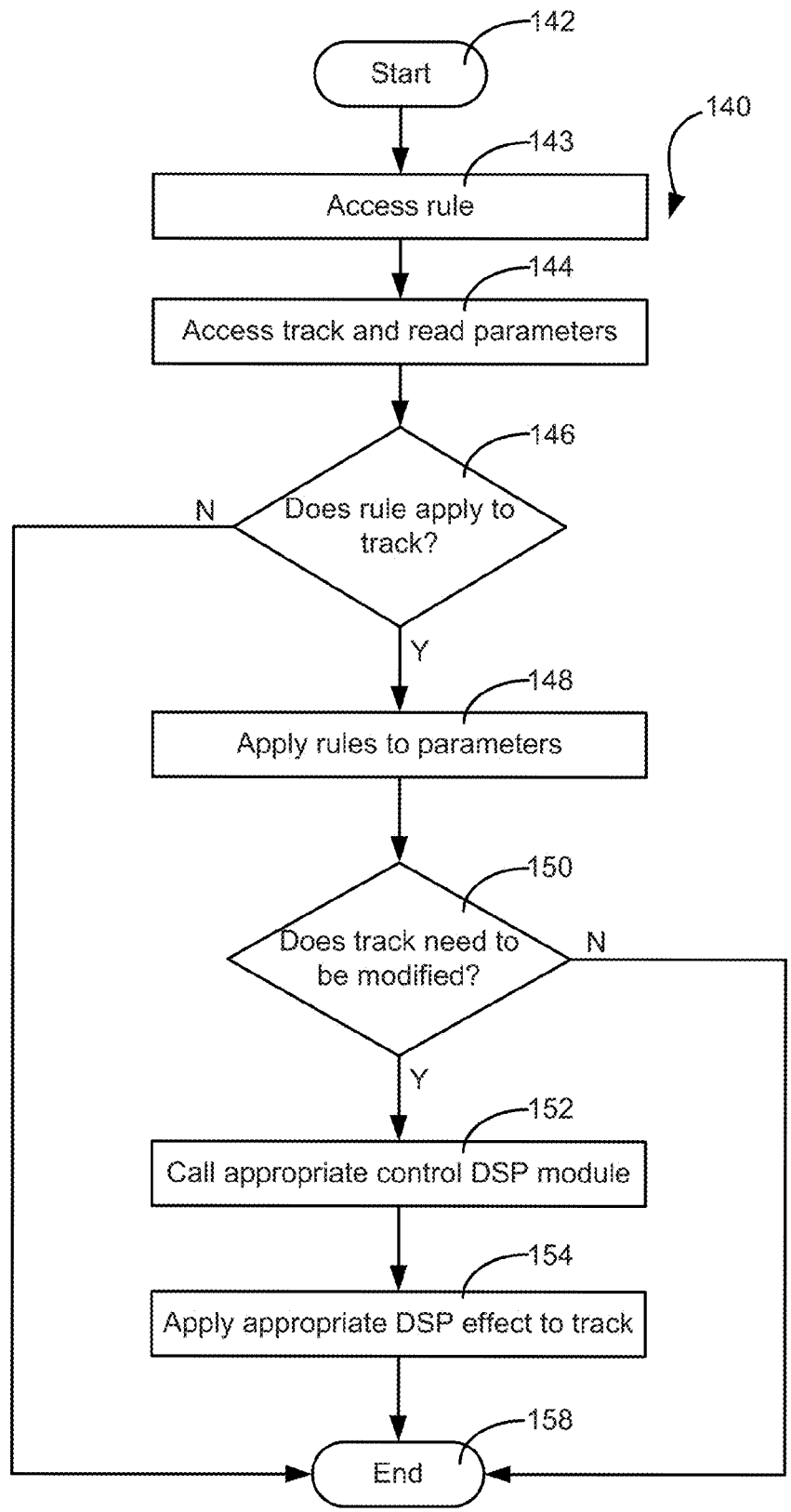
FIG. 6 is a flow chart illustrating the operation of the rules engine included in the audio file generation system, according to an embodiment of the present invention.

Referring now to the flowchart 140 of FIG. 6, operation of the rules engine 50, according to an embodiment of the audio file generation system 10 of the present invention, will now be discussed. The operation may begin at Block 142, wherein the rules engine 50 may access a rule from the rules database 25 (Block 143). The rules engine 50 may next access the track 42 and read its associated parameters (Block 144). After reading the parameters for a rule, the rules engine 50 may next determine whether the rule may apply to the track 42 (Block 146). The rules engine 50 may make this determination, for example, by analyzing whether data exists for a parameter to be compared. If the rules engine 50 determines that the rule does not apply to a track 42, the operation may end at Block 158. However, if the rules engine 50 determines that the rule may apply to the track 42, the rules engine 50 may apply the rules to the parameters of the track 42 (Block 148).

After the applying the rules to the track 42, the rules engine 50 may determine whether the track 42 is compliant with the rules. More specifically, the rules engine 50 may determine whether the track 42 requires modification (Block 150). If no modification is required, the rules engine 50 may terminate at Block 158. However, if the rules engine 50 determines that the track 42 requires modification, it may call an appropriate control DSP module 60 that may include a DSP effect 62 to be applied to the track 42 requiring modification (Block 152). The control DSP module 60 may then apply the DSP effect 62 to the track 42, modifying the digital audio signal included therein (Block 154). The operation performed by the rules engine 50 may then terminate at Block 158.

Figure 7:
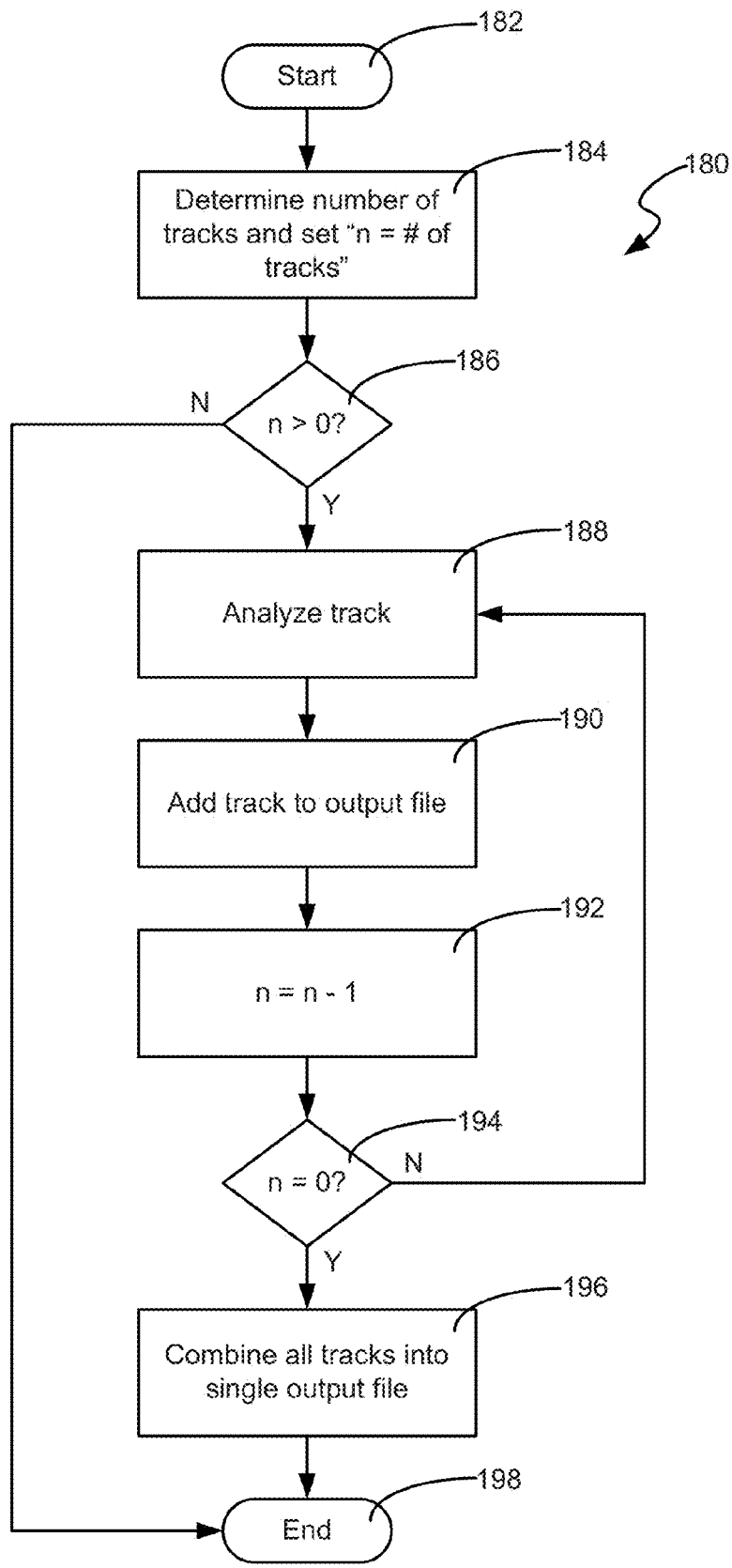
FIG. 7 is a flow chart illustrating the operation of the combiner included in the audio file generation system, according to an embodiment of the present invention.

Referring now to the flowchart 180 of FIG. 7, the operation of the combiner 70, according to an embodiment of the audio file generation system 10 of the present invention, will now be discussed. A person of skill in the art will appreciate that the following example is provided for the sake of clarity and that the tracks 42 may be merged or combined by various other methods. The operation may begin at Block 182, wherein the combiner 70 may determine the number of tracks 42, setting a variable "n" equal to the total number of tracks 42 (Block 184). The combiner 70 may next determine whether any tracks 42 exist to be combine, determining whether logically "n>0" (Block 186). If there are no tracks 42 to be merged by the combiner 70, the operation may terminate at Block 198.

However, if there are tracks 42 to be merged, the combiner 70 may analyze the first track 42 to be merged (Block 188). The combiner 70 may next add the track 42 to the output file 80, which may be generated as a product of the merging operation (Block 190). The combiner 70 may then decrement the track 42 counter, or perform the logical operation of "n=(n−1)" (Block 192). The combiner 70 may then determine whether any tracks 42 remain to be merged into the output file 80, or determine whether logically "n=0" (Block 194). If tracks 42 remain to be merged into the output file 80, the combiner 70 may return to the operation of Block 188, wherein it may analyze the next track 42. However, if no tracks 42 remain to be merged into the output file 80, the combiner 70 may terminate at Block 198.

Figure 8:
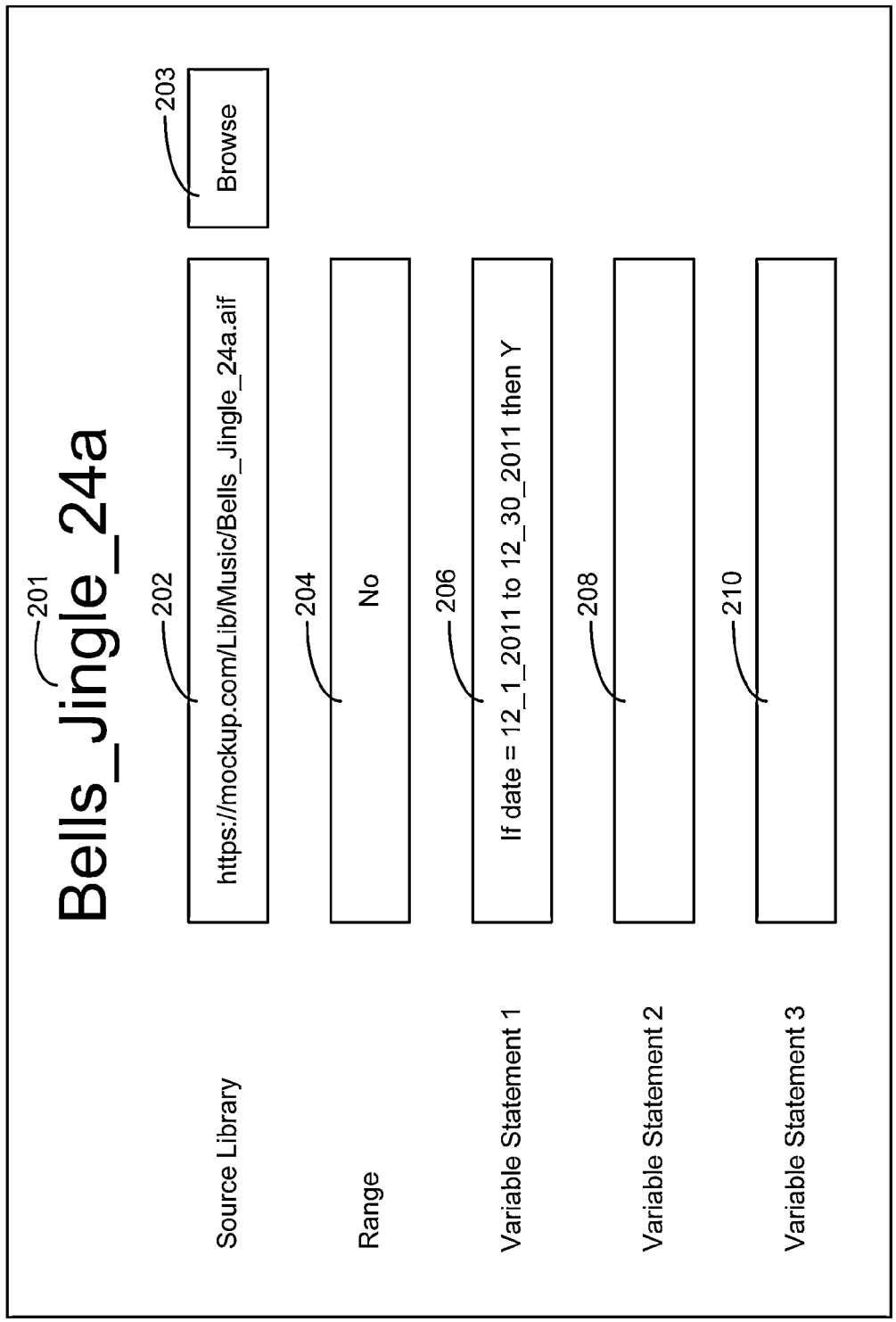
FIG. 8 is an illustration of a user interface, according to an embodiment audio file generation system of the present invention.

As discussed above, and as perhaps best illustrated in reference to FIG. 8, a user may interact with the audio file generation system 10 of the present invention via a user interface. The user interface may include a plurality of fields. A person of skill in the art will appreciate that fields depicted in the interface 200 are provided solely as an example. Skilled artisans will appreciate that any number of fields may be included in, or omitted from, the interface 200 of the present example.

The interface 200 depicted in FIG. 8 illustrates a model interface for defining a rule that may apply to a track 42. The title 201 of the rule may be included at the top of the interface 200. The interface 200 may include a plurality of fields, which may be interacted by a user. A "Source Library" field 202 may be included in the interface 200 to define the location of a track 42 to be included in the output file 80. Additionally, the "Source Library" field 202 may be included in the interface 200 to define a track library that may include one or more track 42. The tracks 42 within the tracks library may be partially or entirely included in the master track 40, where in DSP effects 62 may be applied to one or more of the tracks 42 before being combined into an output file 80.

To locate a track 42 or track library by using a directory tree interface, a user may active a "Browse" operator 203. The user may then navigate a directory tree structure similar to file browsing system found in common operating systems, such as Microsoft Windows or Apple OSX. Additionally, a "Range" field 204 may be included to select a portion of the tracks 42 from the track database to be included in the master track. One or more rules may be applied to the tracks 42 selected from the track database 21, which may result in the application of DSP effects 62.

For example, and presented without limitation, a user may desire to use the audio file generation system 10 of the present invention to generate an audio holiday greeting for his co-workers. The names of the co-workers may be stored in a database server 20 as individual tracks 42, wherein each track may be associated with an individual name. The tracks 42 with co-worker names may be collectively grouped in a "co-worker names" track library. The user may add the "co-worker names" track library to the master track 40 of the audio file generation system 10, wherein rules may be applied to create a plurality of personalized audio holiday greeting messages tailored for each co-worker.

Additionally, for example, the user may limit the generation of greeting messages to co-workers in the legal department. The user may enter "legal department," or some other range identifier, into the "Range" field 204 to restrict the master track to only include tracks with co-worker names that work in the legal department. A person of skill in the art will appreciate examples to be included in the audio file generation system 10 of the present invention that are consistent with the aforementioned examples.

The "Variable Statement" fields 206, 208, 210 may be used to define the logic operations performed by the rules engine 50. A user may enter a logic comparison, which may be used to compare parameters with additional data to determine compliance with a rule. For example, as illustrated in the "Variable Statement 1" field 206 of the interface 200, the rule may be defined to determine whether the present data is within the month of December. If the present data exists between the lower parameter of Dec. 11, 2011 and the upper parameter of Dec. 30, 2011, the rule may return that the condition is met and the parameters are therefore compliant with the rule. The return of compliance may result in the addition of a track 42, such as a jingle bells track 42, to the output the 80 generated by the combiner 70.

The following additional example of logical operation, which may be included within the "Variable Statement" fields 206, 208, 210 of the interface 200, will now be discussed for additional clarity and without the intent to limit the present invention in any way. The additional model rule may include a logical determination of whether a track 42 exists. For example, the logical operation of "If X, then Y," may define the addition of a second "Y" track 42 upon the determination that a first "X" track 42 is present. Similarly, a logical operation such as, "If !X then Y=(Y−1000)" may define a rule wherein the absence of an "X" tracks 42 may result in time shifting a "Y" track 42 to playback 1000 milliseconds earner that previously defined. This 1000 millisecond time shift may result in the "Y" track 42 playing at approximately the same time that the "X" track 42 would have played, had it been present.

Figure 9:
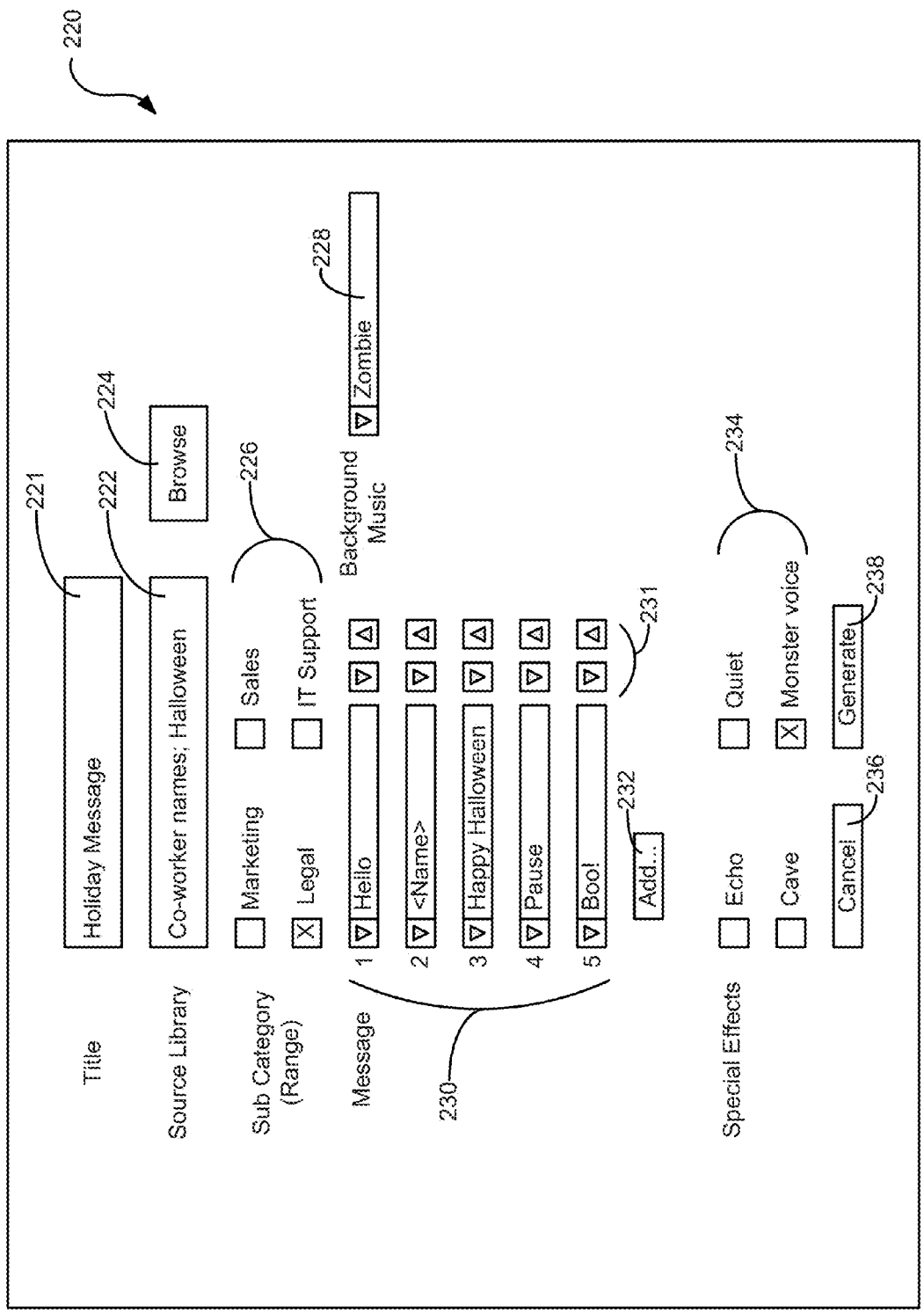
FIG. 9 is an illustration of a user interface, according to an embodiment audio file generation system of the present invention.

Referring now to FIG. 9, an alternative embodiment of a user interface will now be described. The following user interface may allow a user to interact with the audio file generation system 10 of the present invention via an accessible interface. The following interface may be a "Mix Method" interface 220, which may allow a user to select a plurality of "Source Libraries 222," "Ranges 226," "Special Effects 234," and rules by interacting with a graphical user interface (GUI).

The "Mix Method" interface 220 of the present example may include an editable "Title" field 221. The "Title" field 221 may be used to generate at least part the file name for the resulting output file 80. Additionally, the "Title" field may be used to classify and describe the generated output file 80. The user may additionally select one or more source libraries via the respective "Source Library" field 222. In the present example, a user may select an individual track 42 and/or a track library, which may include a plurality of tracks 42. Additionally, a user may select a plurality of tracks 42 and/or track libraries within the "Source Library" field 222. If the user desires to use a directory tree structure to choose a track 42 and/or source library, he may select the "Browse" operator 224. As will be appreciated by a person of skill in the art, the "Browse" operator 224 of the present example may function similarly to the "Browse" operator 203 of FIG. 8.

The "Mix Method" interface 220 of the present example may further include a "Sub-Category" field 226, which may allow the user to select one or more ranges to which the rules and DSP effects 62 may be applied. In the present example, the user has elected to apply the rules and DSP effects 62 to only the legal department of the "co-worker names" database.

Additionally, since the user has also included a Halloween track database, the user may select zombie "Background Music" 228, which may be included in the Halloween track database.

The user may select one or more message to be included within the master track 40, which may correspondingly be included in the output file 80. In the present example, the messages may be selected by choosing an option from a dropdown menu. However a person of skill in the art will appreciate additional method selecting operators that may be included in the "Mix Method" interface 220, such as, but not limited to, checkboxes or radio buttons. Additionally, the messages may be arranged to be played in a desired order by using the corresponding "Rearranging Buttons" 231.

Special effects, or DSP effects 62, may be enabled or disabled by checking the respective special effects operators 234. In the illustrated "Mix Method" interface 220, the user has selected the "Monster Voice" DSP effects module 62, which may result in the alteration of the spoken words of the Halloween themed audio message to sound as if the words were spoken by a monster. A person of skill in the art will appreciate that, although checkboxes have been illustrated in FIG. 9, any number of interactive operators may be used to allow a user to select or enable a DSP effect 62 to be applied to a track 42.

Once the user has configured the fields and operators to create the desired output audio file 80, he or she may initiate the combining operation by selecting the "Generate" button 238. The combining operation has been described in greater detail in flowchart 180 of FIG. 7 and its accompanying description. Alternately, a user may cancel the audio file generation process by selecting the "Cancel" button 236. Optionally, a confirmation message may be presented to the user to avoid inadvertent cancellation of the audio file generation operation.

A person of skill in the art will appreciate a plethora of additional logical operations that may be defined within a rule through interaction with the user interface 200, "Mix Method" interface 220, or any other interface consistent with the scope and spirit of the present invention. Additionally, a person of skill in the art will appreciate that numerous additional settings, parameters, and other data may be defined by interacting with a user interface.

Alternately, rules may be generated through a guided user interface (not pictured). The guided user interface may include a wizard, or a series of interface screens that may walk a user through defining rule settings by answering a series of questions. The wizard may prompt a user with questions such as, "Would you like to delay the audio file?" The wizard may additionally include fields for variables, such as the amount of delay desired. In additional embodiments, rules may be uploaded into the rules database 25 via a network 90.

Additionally, the audio file generation system 10 of the present invention may generate an audio output file 80 without the interaction of a user. This automated operation may advantageously allow a system to autonomously generate an output file 80, such as, for example, a personally directed advertisement. In this embodiment, the audio file generation system 10 may detect information that may relate to the directed recipient of the audio output file 80, generate an output file 80 configured for that specific recipient, and deliver the output file 80 to the recipient for his or her consumption.

As an example of the autonomous output file 80 generation, the audio file generation system 10 of the present invention may select the tracks, rules and any other element of the audio file generation system 10 to create an audio output file 80 that is directed to an intended recipient. The audio file generation system may create an audio output file 80 directed to an intended recipient by selecting various elements of the audio file generation system 10 based upon information received related to the intended recipient. For example, the audio file generation system may initiate a geo-locator module, which may detect the internet protocol (IP) address of the intended recipient. Optionally, the geo-locator module may then determine a longitude and latitude from the IP address of the intended recipient. The geo-locator module may then access an external service, such as Google Maps, Mapquest, or the like, to determine what city, zip code, or other geographic indicator is associated with the longitude and latitude. The external service may return this new information to the geo-locator module. The geo-locator module may determine that the user is located in the San Francisco Bay geographic area of California. The audio file generation system 10 may then call DSP modules 60 to apply appropriate DSP effects 62, generating a customized audio file for the recipient. The customized output file may include a message, such as, for example, "Business X is offering a 20% off special to all San Francisco Bay residents. Click the link to redeem this offer." A person of skill in the art will appreciate that the preceding example has been included without limitation to clearly illustrate one of many embodiments for the audio file generation system of the present invention.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the present invention.

That which is claimed is:

1. A method of generating an audio file comprising the steps of:
   accessing a first track from a track database across a network using a user interface in communication with a controller;
   loading the first track into a master track;
   determining a first track parameter;
   accessing a first rule from a rule database across a network using a rules engine;
   determining whether the first track parameter complies with the first rule;
   accessing a first control digital signal processing module from a remote control digital signal processing module database across a network using the rules engine;
   using the controller to apply the control first digital signal processing module to the first track to produce a first modified track;
   accessing a second rule from the remote rule database using the rules engine;
   determining whether the first track parameter complies with the second rule;
   accessing a second control digital signal processing module from the remote control digital signal processing module database;
   using the controller to apply the second control digital signal processing module to the first modified track; and
   creating an output file;
   wherein the output file comprises the first modified track.

2. A method according to claim 1 wherein the step of determining the first track parameter is performed by either reading the parameter from metadata included with the track using the rules engine or by accessing the parameter in a parameters database using the controller.

3. A method according to claim 1 further comprising the steps of:
   accessing a second track from the track database;
   loading the second track into the master track;
   determining a second track parameter;
   determining whether the second track parameter complies with the first rule; and
   applying the first control digital signal processing module to the second track producing a second modified track;
   wherein the step of creating the output file comprises combining the first modified track and the second modified track.

4. A method according to claim 3 wherein the step of combining the first modified track and the second modified track is performed by at least one of the controller or a database server.

5. A method according to claim 1 further comprising the steps of:
   accessing a second track from the track database;
   loading the second track into the master track;
   determining a second track parameter;
   determining whether the second track parameter complies with the second rule; and
   applying the second control digital signal processing module to the second track producing a second modified track;
   wherein the step of creating the output file comprises combining the first modified track and the second modified track.

6. A method according to claim 1 further comprising the steps of:
   accessing a second track from the track database;
   loading the second track into the master track;
   determining a second track parameter;
   determining whether the second track parameter complies with the first rule;
   accessing a third control digital signal processing module from the control digital signal processing module database; and
   applying the third control digital signal processing module to the master track producing a modified master track;
   wherein the modified master track is the output file.

7. A method according to claim 1 wherein the first control digital signal processing module performs a first digital signal processing effect, and the second control digital signal processing module performs a second digital signal processing effect.

8. A method according to claim 1 further comprising the step of providing a notification upon the occurrence of an event to a user via a client device.

9. A method according to claim 8 wherein the event is at least one of successful user login, completion of audio file generation, or an error.

10. A method according to claim 1 wherein the first control digital signal processing module manipulates a segment of the first track.

11. A method according to claim 1 wherein the first control digital signal processing module manipulates a channel of the first track.

12. A method according to claim 1 further comprising the steps of:
   receiving information related to an intended recipient of the output file; and
   transmitting the output file to the intended recipient.

13. A method according to claim 12 wherein the first rule is accessed in response to the received information related to the intended recipient.

14. A method according to claim 13 further comprising the step of determining whether the first rule applies to the first track parameter, wherein the step of loading the first track into the master track occurs upon a determination that the first rule applies to the first track parameter.

15. A method according to claim 13 wherein the step of loading the first track into the master track occurs upon determination that the first track parameter complies with the first rule.

16. A method according to claim 12 wherein the first control digital signal processing module is accessed in response to the received information related to the intended recipient.

17. A method according to claim 12 further comprising the steps of:
   accessing an external service across the network;
   transmitting to the external service the information related to the intended recipient of the output file; and
   receiving from the external service new information related to the intended recipient of the output file.

18. A method according to claim 1 wherein the step of creating an output file includes the step of adding at least one of video data, text data, caption data, and bookmark data to the output file.

* * * * *